(12) United States Patent
Kanemitsu

(10) Patent No.: US 8,860,982 B2
(45) Date of Patent: Oct. 14, 2014

(54) IMAGE FORMING APPARATUS, INSTALLATION METHOD AND UNINSTALLATION METHOD

(75) Inventor: Shigenaka Kanemitsu, Osaka (JP)

(73) Assignee: KYOCERA Document Solutions Inc. (JP)

( * ) Notice: Subject to any disclaimer, the term of this patent is extended or adjusted under 35 U.S.C. 154(b) by 918 days.

(21) Appl. No.: 12/853,509

(22) Filed: Aug. 10, 2010

(65) Prior Publication Data

US 2011/0051183 A1 Mar. 3, 2011

(30) Foreign Application Priority Data

Aug. 31, 2009 (JP) .................................. 2009-199843

(51) Int. Cl.
*G06F 3/12* (2006.01)
*H04N 1/00* (2006.01)
*G06F 9/445* (2006.01)

(52) U.S. Cl.
CPC ...... *H04N 1/00* (2013.01); *G06F 3/123* (2013.01); *H04N 1/00938* (2013.01); *H04N 2201/0094* (2013.01); *H04N 1/0097* (2013.01); *G06F 8/65* (2013.01)

USPC .......................... 358/1.15; 715/238; 715/239

(58) Field of Classification Search
USPC ........................................................ 358/1.15
See application file for complete search history.

(56) References Cited

U.S. PATENT DOCUMENTS 6,366,954 B1 * 4/2002 Traversat et al. ............. 709/220

FOREIGN PATENT DOCUMENTS

| JP | 2007-328770 | 12/2007 |
|---|---|---|
| JP | 2009-037530 | 2/2009 |

* cited by examiner

*Primary Examiner* — Marivelisse Santiago Cordero
*Assistant Examiner* — Aaron R Gerger
(74) *Attorney, Agent, or Firm* — McDonnell Boehnen Hulbert & Berghoff LLP

(57) ABSTRACT

An image forming apparatus includes a storage unit and an installation processing unit. The storage unit is capable of storing an application program and application data that is referred to when the application program is executed. The installation processing unit registers, when installing the application data in the storage device, link data indicating the correspondence between the application identifier of the application program and the data identifier of the application data.

12 Claims, 4 Drawing Sheets

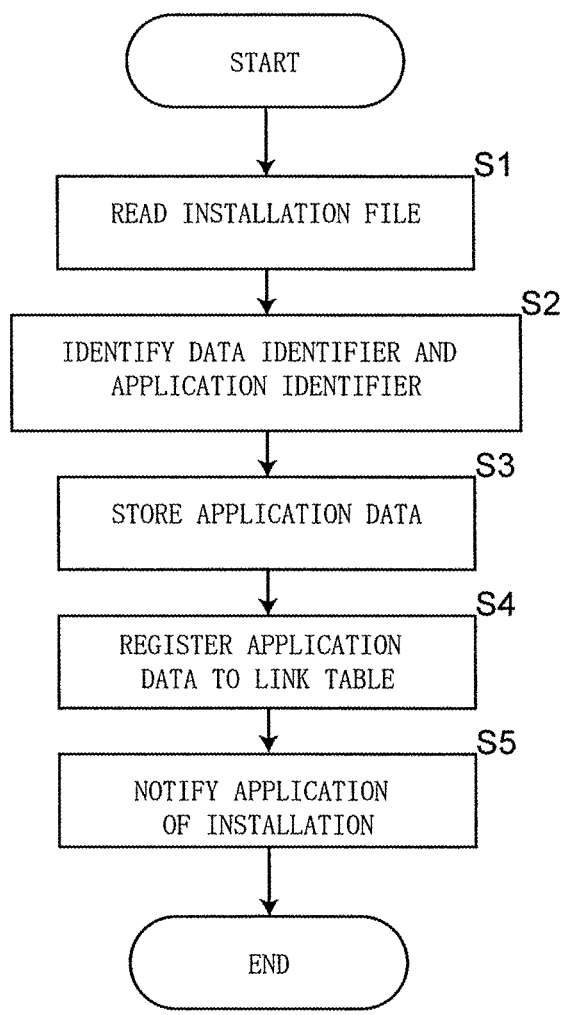

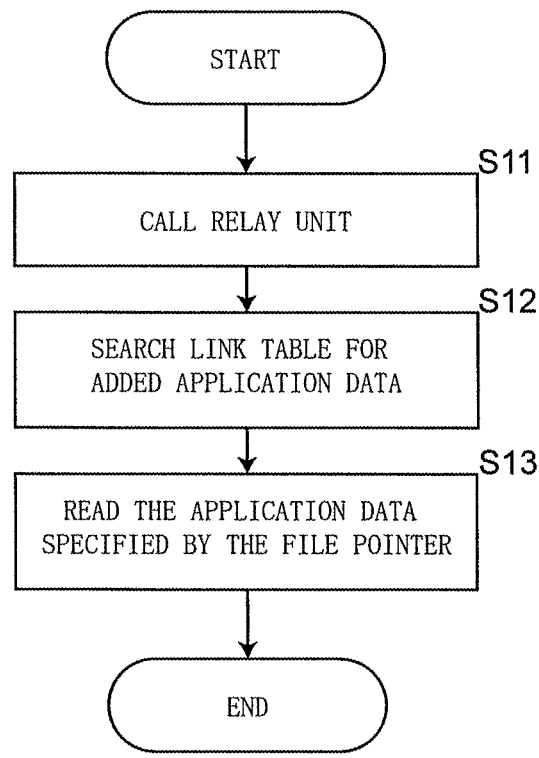

IMAGE FORMING APPARATUS, INSTALLATION METHOD AND UNINSTALLATION METHOD

INCORPORATION BY REFERENCE

This application is based upon and claims the benefit of priority from corresponding Japanese Patent Application No. 2009-199843, filed Aug. 31, 2009, the entire contents of which is incorporated herein by reference.

BACKGROUND

1. Field of the Invention

The present invention relates to an image forming apparatus, an installation method and an uninstallation method.

2. Description of the Related Art

Image forming apparatuses having a Java platform to which a Java application can be added are available.

In a typical image forming apparatus, when an application is added, an installation processing unit extracts an application program and application data from, for example, an installation file. The installation processing unit then installs the application program and the application data as a package onto a storage device provided in the image forming apparatus. The application data is data requested when the application program is executed. The application data is not user data, but is instead setting data required to execute the application program.

Applications to be added to an image forming apparatus are managed in units of the packages described above, and are installed or uninstalled on a package-by-package basis. Installation and uninstallation of packages is prohibited for general users and is restricted to only administrative users. The installation or uninstallation of a package is not permitted until, for example, an administrator logs in.

In some cases, application data used for an application is added or changed after the application is installed. For example, in an application that allows a form format and numerical data to be combined and printed, the form format is supplied as application data. Thus, a change in the form format involves a change in the application data.

In another example, a package including an application program and application data is installed using an installation file. Then, another package having additional application data without an accompanying application program may be installed as an application plug-in using another installation file that includes the additional application data.

As described above, applications are managed on a package-by-package basis, and an installation processing unit installs one package as one closed application (or plug-in). Thus, even when there is an association between packages, the association is not taken into account during installation. In general, an application program refers to only application data included in the same package that also includes the application program. It is therefore difficult to determine whether or not additional application data for the application program exists when the application program is executed.

One method of using additional application data may be to use a portable recording medium (such as a memory card or a Universal Serial Bus (USB) memory device) that stores the application data. A memory card storing additional application data is connected to an image forming apparatus so that a file system provided in the image forming apparatus can read the application data.

However, in the method of using a portable recording medium that stores application data, the recording medium needs to be continuously connected to an image forming apparatus. If the recording medium is removed from the image forming apparatus, the application may operate incorrectly. Further, while the recording medium is continuously connected to the image forming apparatus, a connection terminal to which the recording medium is connected is not used for other purposes. Therefore, the above method of using a portable recording medium may not be desirable.

SUMMARY

The present disclosure provides an image forming apparatus and an installation method in which, even if an operation such as addition and/or modification of application data or deletion of additional application data is performed for an installed application program, additional application data for the application program can be readily specified for the application program.

According to an aspect of the present disclosure, an image forming apparatus includes a storage unit configured to store an application program and application data that is referred to when the application program is executed, and an installation processing unit configured to register, when installing the application data into the storage device, link data indicating a correspondence between an application identifier of the application program and a data identifier of the application data.

According to another aspect of the present disclosure, an installation method for an image forming apparatus capable of executing an application program includes the steps of installing an application program and application data that is referred to when the application program is executed, and when installing the application data into a storage unit, registering link data indicating a correspondence between an application identifier of the application program and a data identifier of the application data.

Additional features and advantages are described herein, and will be apparent from the following Detailed Description and the figures.

BRIEF DESCRIPTION OF THE DRAWINGS

In the accompanying drawings:

FIG. 3 is a flowchart describing the installation of additional application data in the MFP illustrated in FIG. 1; and FIG. 4 is a flowchart describing the detection of application data when an application program is executed in the MFP illustrated in FIG. 1.

DESCRIPTION OF THE PREFERRED EMBODIMENTS

An embodiment of the present disclosure will now be described with reference to the drawings.

Figure 1:
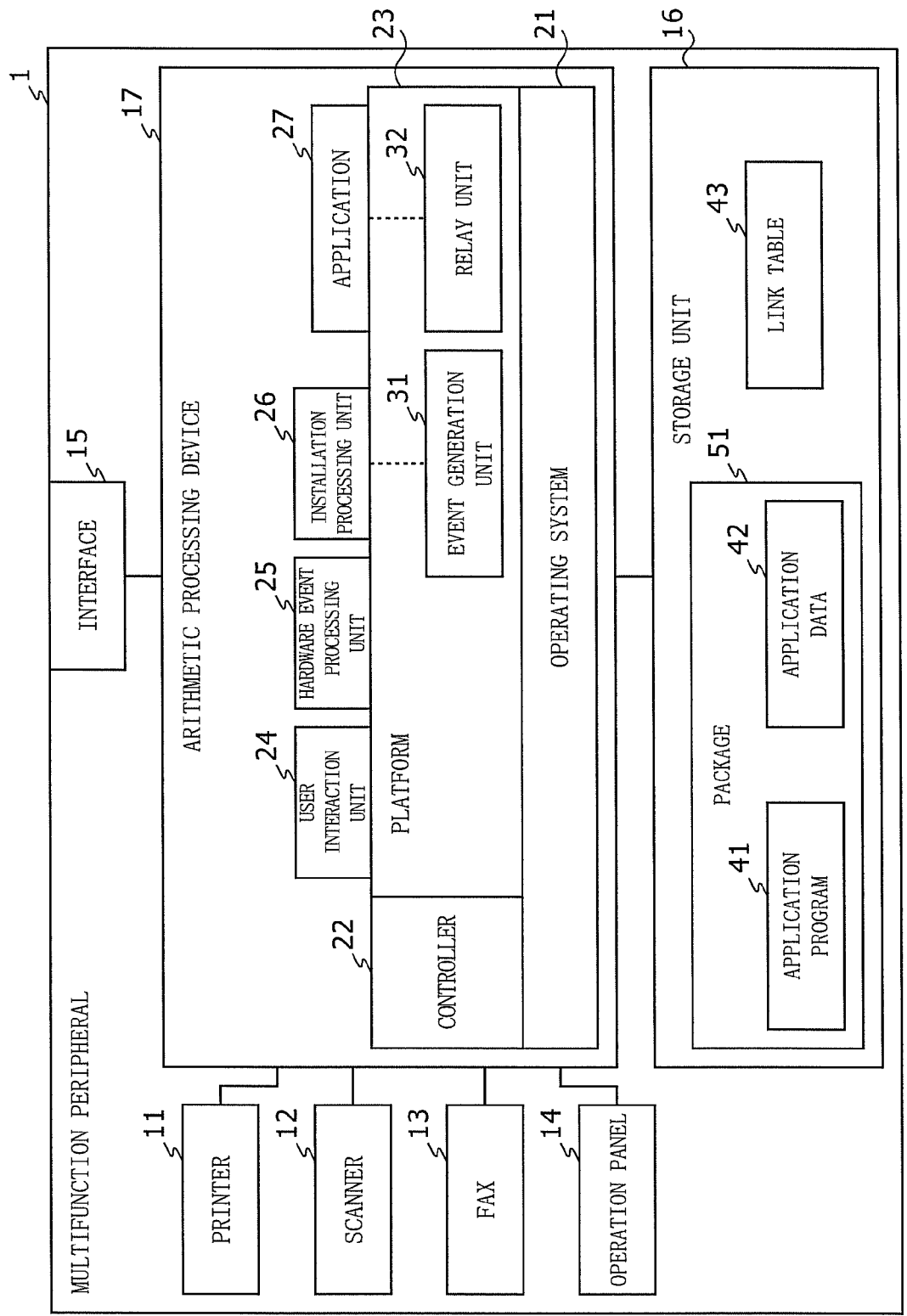
FIG. 1 is a block diagram illustrating the configuration of a multifunction peripheral (MFP) according to an embodiment of the present invention.

FIG. 1 is a block diagram illustrating the configuration of a MFP 1 according to an embodiment of the present invention. The MFP 1 is an example of an image forming apparatus, and includes a printer 11, a scanner 12, a facsimile (FAX) device 13, an operation panel 14, an interface 15, a storage unit 16, and an arithmetic processing device 17.

The printer 11 is a device that prints a document image based on print data. The scanner 12 is a device that optically reads a document image from a document to generate image data of the document image. The facsimile device 13 is a device that generates a facsimile signal from document data to be transmitted and transmits the facsimile signal. The facsimile device 13 further receives a facsimile signal and converts the facsimile signal into document data.

The operation panel 14 is placed on a surface of a housing of the MFP 1, and includes a display device that displays information to a user, and an input device that detects a user operation. Examples of the display device include a liquid crystal display. Examples of the input device include a key switch and a touch panel.

The interface 15 is a circuit that can be connected to a portable recording medium such as a USB memory device or a memory card. Examples of the interface 15 include a USB interface and a memory card reader. Examples of the memory card include a Secure Digital (SD) memory card and a Compact Flash (CF) card.

The storage unit 16 is a device that can store various programs and various data. Examples of the storage unit 16 include non-volatile storage media such as a hard disk drive and a non-volatile memory.

The arithmetic processing device 17 is a computer including a central processing unit (CPU), a read only memory (ROM), and a random access memory (RAM). A program is loaded into the RAM from the storage unit 16 or the like, and is executed by the CPU. As a result, various processes are implemented.

The storage unit 16 stores programs necessary for the MFP 1 to operate. The storage unit 16 has a package 51 installed therein. The package 51 includes a set that comprises application program 41 and application data 42, which is necessary for the operation of an application installed from an installation file. The application data is data that is referred to and requested when the application program is executed. The application data is not user data, but instead contains setting data required to execute the application program. In the illustrated embodiment, one piece of application data is stored as one data file in the storage unit 16.

As one example, the application program 41 of an application includes a user interface, and the application data 42 is screen data used in the user interface.

Further, in another example, in an application that allows a form format and numerical data to be combined and printed, the form format is the application data 42.

In the MFP 1, applications are managed in units of the packages described above, and are installed or uninstalled on a package-by-package basis. Installation and uninstallation of packages is prohibited for general users and is restricted to administrative users. The installation or uninstallation of a package is not permitted until an administrator logs in.

The storage unit 16 also stores a link table 43. During additional installation of other application data corresponding to the application program 41, the link table 43 has link data about the other application data. The link data represents the correspondence between the application identifier of the application program 41 and the data identifier of the application data to be additionally installed.

Figure 2:
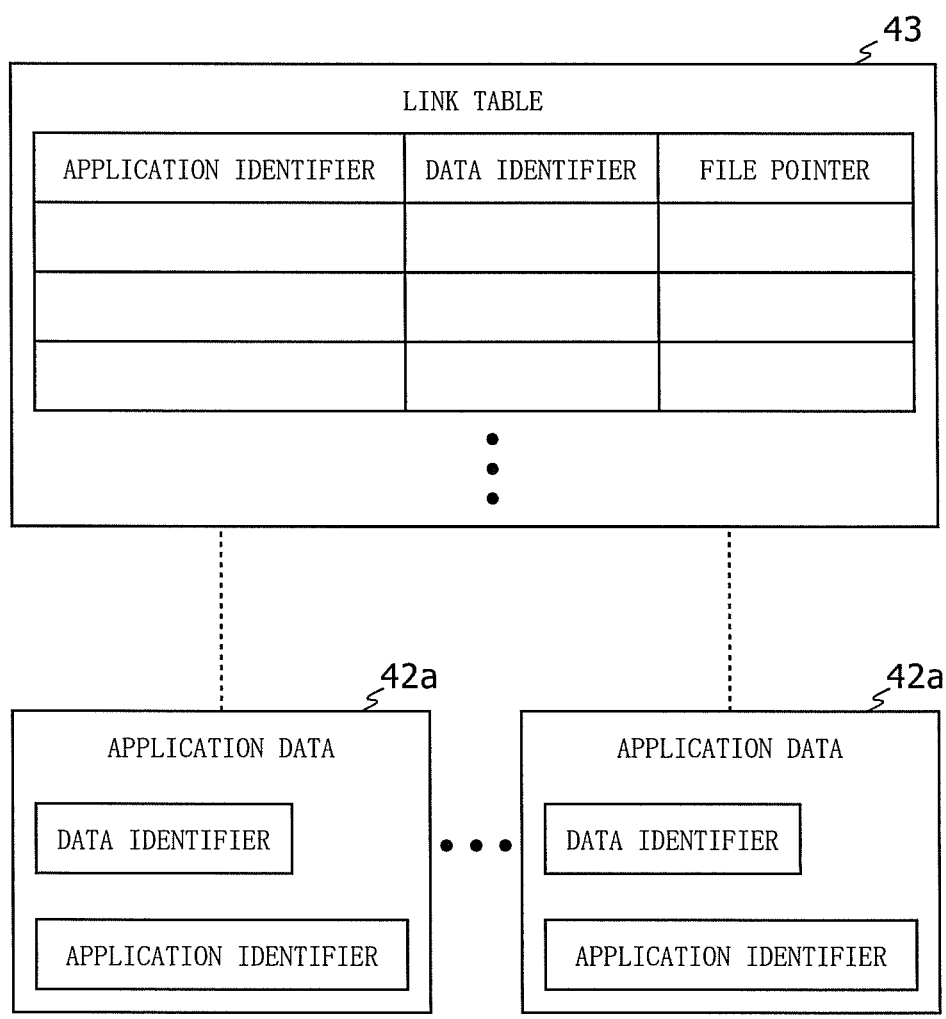
FIG. 2 is a diagram illustrating a portion of the data structure of a link table and application data in the MFP illustrated in FIG. 1.

FIG. 2 is a diagram illustrating a portion of the data structure of the link table 43 and the application data 42 in the MFP 1 illustrated in FIG. 1.

Additional application data is installed as a package using an installation file. As illustrated in FIG. 2, the header of the additional application data 42a includes a data identifier unique to the application data 42a and an application identifier of an application program that uses the application data 42a.

In the link table 43, link data includes an application identifier, the data identifier of the application data 42a that is additionally installed for the application program 41 assigned the application identifier, and a file pointer to a data file of the application data 42a. The file pointer is a file identifier such as a file path or a file handle. The link data may include information such as the date and time of installation of the application data 42a and version information of the application data 42a.

After the MFP 1 is started, a program (not illustrated) stored in the storage unit 16 is executed by the arithmetic processing device 17 as appropriate. Using the program, an operating system (OS) 21, a controller 22, a platform 23 such as a Java virtual machine, a user interaction unit 24, a hardware (HW) event processing unit 25, and an installation processing unit 26 are implemented.

After the OS 21, the controller 22, and the platform 23 are implemented, an application 27 is implemented when the application program 41 is executed.

The controller 22 controls the printer 11, the scanner 12, the facsimile device 13, and the operation panel 14. The controller 22 also inputs and outputs data to and from the printer 11, the scanner 12, the facsimile device 13, and the operation panel 14. A controller application program interface (API) is mounted in order to use the controller 22. The controller API causes the controller 22 to operate according to an instruction from an application operating on the platform 23, which may execute the functions of the printer 11, the scanner 12, the facsimile device 13, and the operation panel 14, or which may cause input and output of data among the printer 11, the scanner 12, the facsimile device 13, and the operation panel 14.

The platform 23 is an execution architecture on which the application program 41 can be executed. In the embodiment, the platform 23 may be a Java virtual machine capable of executing a Java application, and the application program 41 may be a Java application program.

The platform 23 includes an event generation unit 31 and a relay unit 32.

The event generation unit 31 is a processing unit that, when the application 27 is currently being executed, detects an installation event. An installation event occurs when the installation of additional application data 42a is completed. When the application 27 corresponding to the application data 42a is currently operating, the event generation unit 31 notifies the application 27 of the occurrence of the installation event. Upon receipt of the notification, the application 27 reads additional application data 42a as necessary.

When the application program 41 is executed, the relay unit 32 refers to the link data in the link table 43, and searches for the other application data 42a additionally installed for the application program 41. When the application program 41 is executed, the other application data found by the relay unit 32 as a result of the search is read. The relay unit 32 includes a search engine and a search API for searching the link table 43. The relay unit 32 is called from the application program 41 using the search API, and a search is executed.

The user interaction unit 24 controls the operation panel 14 using the controller 22 to display various messages or detect a user operation when the application data 42a is additionally installed.

The HW event processing unit 25 detects that a recording medium such as a memory card has been connected to the interface 15.

The installation processing unit 26 installs the package 51 including the application program 41 and the application data 42, and additionally installs a package including the application data 42a. After the application program 41 and the application data 42 have been installed in the storage unit 16, when the other application data 42a for the application program 41 is additionally installed in the storage unit 16, the installation processing unit 26 registers the link data corresponding to the other application data 42a in the link table 43.

The application 27 is formed by executing the application program 41 on the platform 23. When the occurrence of a function execution request by a user is detected according to the operation of the operation panel 14 by the user, the application 27 causes the controller 22 to execute the operation specified by the function execution request via the controller API. In this manner, the controller 22 controls the printer 11, the scanner 12, the facsimile device 13, and the operation panel 14 to execute the operation specified by the function execution request.

Next, the operation of the MFP 1 will be described, as follows: (A) installation of additional application data, (B) uninstallation of the additional application data, and (C) detection of application data when an application program is executed.

(A) Installation of Additional Application Data

FIG. 3 is a flowchart describing the installation of additional application data in the MFP 1 illustrated in FIG. 1.

According to one example, the HW event processing unit 25 detects that a recording medium (such as a memory card) storing an installation file including the additional application data 42a has been connected to the interface 15, and the user interaction unit 24 detects an installation instruction by a user. Then, the installation processing unit 26 reads the installation file including the additional application data 42a from the recording medium connected to the interface 15 (step S1).

The installation processing unit 26 refers to the header of the application data 42a included in the installation file, and identifies the data identifier of the application data 42a and the application identifier of the application program 41 that uses the application data 42a (step S2).

The installation processing unit 26 stores a package including the additional application data 42a in the storage unit 16 using the installation file (step S3). The installation processing unit 26 generates link data about the application data 42a, and adds the link data to the link table 43 (step S4).

If the application 27 that is assigned the application identifier specified by the header of the application data 42a is currently being implemented, the event generation unit 31 notifies the application 27 of the occurrence of the additional installation of the application data 42a (step S5), when the additional installation is completed. Upon receiving the notification of the additional installation of the application data 42a, the application 27 reads and uses the application data 42a, as necessary.

In the manner described above, the application data 42a is additionally installed, and link data indicating the correspondence between the application data 42a and the application program 41 is registered in the link table 43.

(B) Uninstallation of Additional Application Data

When the user interaction unit 24 detects an uninstallation instruction by a user, the installation processing unit 26 deletes, from the storage unit 16, the package including the additional application data 42a and deletes, from the link table 43, the link data including the data identifier of the deleted application data 42a.

In the manner described above, the additionally installed application data 42a is uninstalled, and link data indicating the correspondence between the now deleted application data 42a and the application program 41 is deleted from the link table 43.

(C) Detection of Application Data when Application Program is Executed

FIG. 4 is a flowchart describing detection of application data when an application program is executed in the MFP 1 illustrated in FIG. 1.

When the application program 41 is executed, the relay unit 32 is called in response to a query from the application program 41 (step S11). In this case, the relay unit 32 is notified of the application identifier of the application program 41. The relay unit 32 searches the link table 43 for link data using the application identifier as a key, and extracts link data including the application identifier (step S12).

The relay unit 32 notifies the application program 41 of a file pointer included in the extracted link data, and the application program 41 reads the application data 42a as the file specified by the file pointer (step S13).

Thus, the application data 42a is used in the application program 41, and the application 27 is implemented.

According to the embodiment, therefore, the MFP 1 incorporates therein the platform 23 that serves as an application execution architecture, and can execute the application program 41 on the platform 23. After the application program 41 and the application data 42 are installed in the storage unit 16, when the other application data 42a for the application program 41 is additionally installed in the storage unit 16, the installation processing unit 26 registers link data indicating the correspondence between the application identifier of the application program 41 and the data identifier of the application data 42a to be additionally installed.

Thus, even if an operation such as addition and/or modification of application data or deletion of additional application data is performed for an installed application program, additional application data for the application program can be readily specified for the application program by referring to the link data.

In the embodiment described above, furthermore, the installation processing unit 26 installs the application program 41 and the application data 42 using a first installation file, and additionally installs the other application data 42a using a second installation file different from the first installation file.

Accordingly, the installation and uninstallation of application programs and application data is managed on a package-by-package basis. For example, even when a user connects a recording medium including additional application data to the interface 15, it is difficult for the user to additionally install other application data because, in general, application programs do not use application data that is not included in the same package as that of the application programs. Therefore, a potential security vulnerability caused by the additional installation can be reduced.

In the embodiment described above, furthermore, when the application program 41 is executed, the relay unit 32 refers to the link data, and searches for the other application data 42a additionally installed for the application program 41.

Thus, the additional application data 42a for the application program 41 to be executed can be readily specified based on the search result from the application program's 41 query to the relay unit 32. An API for reading the additional application data 42a is provided, and the application program 41 itself does not search for the additional application data 42. Thus, even in the presence of a plurality of application vendors, the additional application data 42a can be commonly read. In addition, even when the existing application program 41 is used in the MFP 1, no need exists to modify the existing application program 41.

The foregoing embodiment is merely a preferred example of the present invention, and the present invention is not to be limited thereto. It is to be understood that a variety of modifications and changes can be made without departing from the scope of the present invention.

For example, in the embodiment described above, both the application data 42 in the package 51 that is the same as that of the application program 41 and the additional application data 42a may be read and used from the application program 41. Alternatively, it is possible that only the additional application data 42a may be used without using the application data 42 in the package 51 that is the same as that of the application program 41.

Further, in the embodiment described above, the relay unit 32 may be notified of search conditions other than an application identifier, such as the date and time of installation and version information, from the application program 41, and link data that satisfies the alternative search conditions may be narrowed down for extraction. The search conditions may be set by a user operation detected by the user interaction unit 24. Alternatively, a search may be executed using an application identifier as a primary key and other factors (such as the date and time of installation) as secondary keys.

In the embodiment described above, furthermore, a communication circuit (such as a network interface or a modem) may be connected to a communication line such as a network so that data can be communicated, and the installation processing unit 26 may download an installation file including the additional application data 42a using the communication line and may perform additional installation.

In the embodiment described above, moreover, the relay unit 32 may expand the application data 42a, which is specified by a file pointer included in extracted link data, in a memory (RAM) provided in the arithmetic processing device 17, and may pass the top pointer of the application data 42a in the memory to the application program 41. In this case, the application data 42a may be expanded in a memory area reserved in advance using the application program 41.

What is claimed is:

1. An image forming apparatus comprising:
    a storage unit configured to store a link table;
    an installation processing unit configured to (i) register in the link table first link data indicating a correspondence between an application identifier of an application program and a first data identifier of application data, and (ii) register in the link table, when additionally installing other application data for the application program into the storage unit after the application program and the application data are installed into the storage unit, second link data indicating a correspondence between the application identifier of the application program and a second data identifier of the other application data; and
    a relay unit configured to refer to the link table and search for the other application data for the application program when the application program is executed,
    wherein, when the application data and the other application data are stored in the storage unit as different files, the installation processing unit is further configured to add a file pointer to the application data in the second link data, and the relay unit is further configured to search the other application data for the file pointer to the application data, and
    wherein the installation processing unit is further configured to add at least a date and time of installation or version information of the other application data in the second link data, and the relay unit is further configured to search for the other application data using the application identifier as a primary key and at least the date and time of installation or the version information as secondary keys.

2. The image forming apparatus according to claim 1, wherein the relay unit is further configured to expand the other application data in a memory, and pass a top pointer of the other application data in the memory to the application program.

3. The image forming apparatus according to claim 2, wherein the relay unit is further configured to expand the other application data in a memory area reserved in advance using the application program.

4. The image forming apparatus according to claim 1, further comprising a user interaction unit, wherein at least one of the primary key and the secondary key is set by an operation detected by the user interaction unit.

5. The image forming apparatus according to claim 1, wherein the relay unit is further configured to search for the application data using the application identifier as a primary key and a search condition as a secondary key.

6. The image forming apparatus according to claim 1, wherein the installation processing unit is further configured to install the application program and the application data using a first installation file, and additionally install the other application data using a second installation file.

7. The image forming apparatus according to claim 6, wherein the second installation file includes the other application data, and does not include the application program.

8. The image forming apparatus according to claim 1, wherein when the application program is executed, the other application data found by the relay unit as a result of the search is read instead of the application data installed together with the application program.

9. The image forming apparatus according to claim 1, wherein when the application program is executed, both the application data installed together with the application program and the other application data found by the relay unit as a result of the search are read.

10. The image forming apparatus according to claim 1, further comprising a network interface,
    wherein the installation processing unit is further configured to download an installation file including the other application data via the network interface, and execute additional installation of the other application data.

11. The image forming apparatus according to claim 1, further comprising a Java platform serving as a Java application execution architecture,
    wherein the application program comprises a Java application program.

12. An installation method for an image forming apparatus capable of executing an application program, comprising:
    storing a link table in a storage unit;
    registering in the link table first link data indicating a correspondence between an application identifier of the application program and a first data identifier of application data;
    registering, when additionally installing other application data for the application program into the storage unit after the application program and the application data are installed into the storage unit, second link data indicating the correspondence between the application identifier of the application program and a second data identifier of the other application data;

referring to the link table and searching for the other application data for the application program when the application program is executed;

adding, when the application data and the other application data are stored in the storage unit as different files, a file pointer to the application data in the second link data, and searching the other application data for the file pointer to the application data; and adding at least a date and time of installation or version information of the other application data in the second link data, and searching for the other application data using the application identifier as a primary key and at least the date and time of installation or the version information as secondary keys.

* * * * *